H. McCREARY.
STORAGE BATTERY.
APPLICATION FILED MAY 10, 1920.
1,369,931.
Patented Mar. 1, 1921.
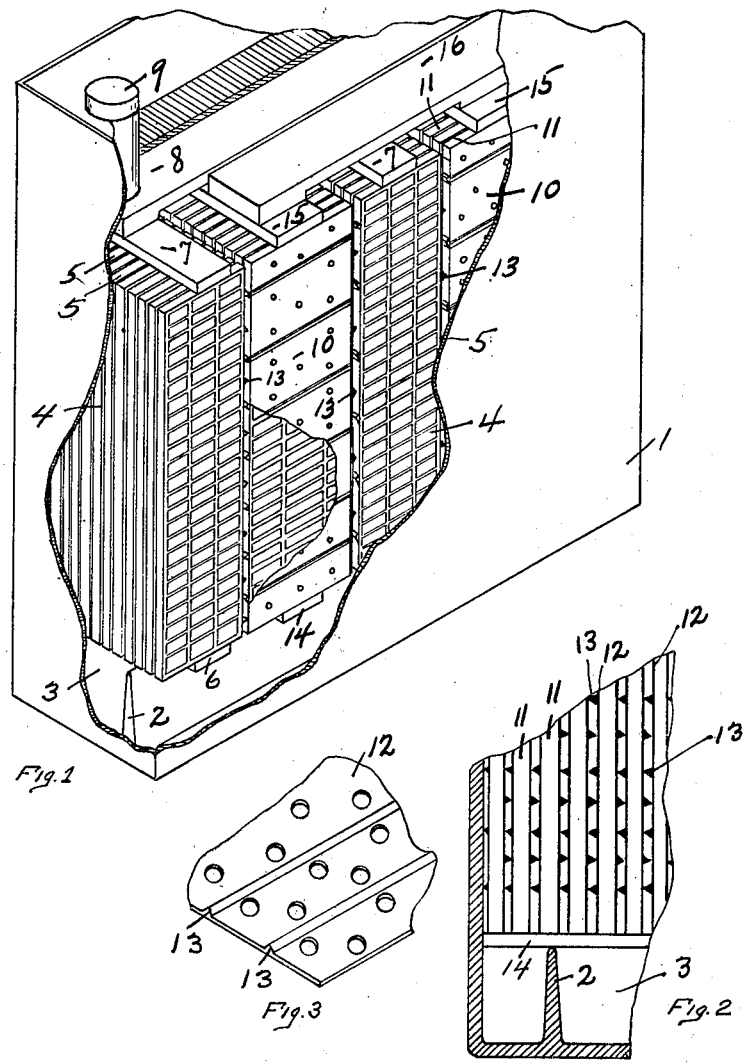
INVENTOR
Harry McCreary
ATTORNEY

UNITED STATES PATENT OFFICE.

HARRY McCREARY, OF YOUNGSTOWN, OHIO.

STORAGE BATTERY.

1,369,931. Specification of Letters Patent. Patented Mar. 1, 1921.

Application filed May 10, 1920. Serial No. 380,312.

*To all whom it may concern:*

Be it known that I, HARRY McCREARY, citizen of the United States of America, residing at Youngstown, in the county of Mahoning and State of Ohio, have invented certain new and useful Improvements in Storage Batteries, of which the following is a specification.

This invention relates to storage batteries, and more particularly to batteries used in automobiles or places where it is desirable to secure the greatest capacity of the battery where the size and weight is a matter to be considered.

The principal object is to produce a cheap and efficient battery, whereby each plate is made up of a multiple of grids.

Another object is to provide a battery having greater plate surface, and means for retaining the active material of the positive plates and also to keep the multiples comprising the plate from buckling.

With these and other objects in view this invention consists of certain novel combinations, constructions, and arrangements of parts as will be hereinafter fully described and claimed.

In the accompanying drawing:

Figure 1 is a perspective view, partly in section, of the storage battery.

Fig. 2 is a detail sectional view showing a portion of the positive plate with rubber retainers for retaining active material on grids.

Fig. 3 is a detail view showing a portion of the rubber retainer.

Referring to the drawing by numerals it will be seen that I have provided a jar 1. At the bottom of the jar 1, I have provided supports 2 for the plates within the jar 1. These supports leave a chamber 3 into which the sediment and settlings may sink and thereby keep the plates free from such sediment or settlings.

The negative plates 4 are constructed of a plurality of grids spaced apart by means of a strap 6 at the bottom of the plate 4 and a strap 7 at the top of the plate 4.

The straps 7 are connected by a strap 8 which connects the negative plates 4. Attached to the negative plate strap 8 is a binding post 9. The positive plates 10 are constructed of a plurality of grids 11 which are spaced apart and held from buckling and also retain the active materials on the grids 11 by means of a perfected rubber member 12, provided with ribs 13 used as a brace to hold the perforated material of the grids 11.

It will be seen by referring to Figs. 1 and 2 that the positive plates 10 are composed of a plurality of grids 11 interspersed by the perforated rubber retainers 12, and braced by means of the ribs 13. These grids 11 are secured by means of straps 14 at the bottom of the grids 11 and straps 15 at the top of the grids 11.

The positive plates 10 are joined by means of a plate strap 16. Upon this plate strap 16 a suitable binding post may be placed.

Having thus described my invention, what I claim is:

1. In a device of the class described the combination of negative plates comprising a plurality of grids spaced apart, a strap binding said grids at the top, a strap binding said grids at the bottom, a strap connecting said negative grids with a series of positive plates, comprising a plurality of grids, spaced apart, a perforated rubber retainer, ribs on said perforated rubber retainer, straps binding the lower edges of said grids and the upper edges of said grids, a strap connecting said positive plates, substantially as described.

2. In a device of the class described, a series of positive plates, comprising a plurality of grids, spaced apart, a perforated rubber retainer, ribs on said perforated rubber retainer, straps binding the lower edges of said grids and the upper edges of said grids, a strap connecting said positive plates, substantially as described for the purpose set forth.

In testimony whereof I affix my signature.

HARRY McCREARY.

Witnesses:
C. A. HARPMAN,
W. N. GIFFIN.